(12) United States Patent
Rhemtulla et al.

(10) Patent No.: US 7,313,233 B2
(45) Date of Patent: Dec. 25, 2007

(54) TONE CLAMPING AND REPLACEMENT

(75) Inventors: Amin F. Rhemtulla, Rockaway, NJ (US); Ling Chen, Livingston, NJ (US); Siu H. Lam, WoodCliff Lake, NJ (US)

(73) Assignee: Intel Corporation, Santa Clara, CA (US)

( * ) Notice: Subject to any disclaimer, the term of this patent is extended or adjusted under 35 U.S.C. 154(b) by 96 days.

(21) Appl. No.: 10/459,309

(22) Filed: Jun. 10, 2003

(65) Prior Publication Data

US 2004/0252813 A1    Dec. 16, 2004

(51) Int. Cl.
*H04M 9/08* (2006.01)
(52) U.S. Cl. .......................... 379/406.01; 379/202.01; 370/526
(58) Field of Classification Search ............. 379/88.08, 379/386, 351, 286, 283, 88.07, 88.09, 88.16, 379/202.01; 370/526, 525, 260, 268–269, 370/286–292
See application file for complete search history.

(56) References Cited

U.S. PATENT DOCUMENTS

| | | | | |
|---|---|---|---|---|
| 5,687,177 A | * | 11/1997 | Chitrapu et al. ............. | 370/526 |
| 5,689,556 A | * | 11/1997 | Gupta et al. ............ | 379/406.06 |
| 5,978,760 A | * | 11/1999 | Rao et al. .................... | 704/226 |
| 6,005,854 A | * | 12/1999 | Xu et al. ..................... | 370/335 |
| 6,259,691 B1 | * | 7/2001 | Naudus ....................... | 370/352 |
| 6,347,134 B1 | * | 2/2002 | Sherwood et al. ........ | 379/88.08 |
| 6,400,709 B1 | * | 6/2002 | Yousseff ..................... | 370/352 |
| 6,757,276 B1 | * | 6/2004 | Harper et al. ............... | 370/356 |
| 6,782,361 B1 | * | 8/2004 | El-Maleh et al. ........... | 704/226 |
| 2002/0097842 A1 | * | 7/2002 | Guedalia et al. ........... | 379/67.1 |
| 2002/0118650 A1 | * | 8/2002 | Jagadeesan et al. ........ | 370/260 |
| 2002/0188445 A1 | * | 12/2002 | Li ............................... | 704/233 |
| 2003/0223573 A1 | * | 12/2003 | Tahemezhaadi ........ | 379/406.01 |
| 2003/0235312 A1 | * | 12/2003 | Pessoa et al. ................. | 381/66 |
| 2005/0025073 A1 | * | 2/2005 | Kwan .......................... | 370/260 |
| 2005/0147057 A1 | * | 7/2005 | LaDue ........................ | 370/310 |

* cited by examiner

*Primary Examiner*—Fan Tsang
*Assistant Examiner*—Olisa Anwah
(74) *Attorney, Agent, or Firm*—Kacvinsky LLC (57) ABSTRACT

A method and apparatus to manage tone clamping are described.

15 Claims, 5 Drawing Sheets

TONE CLAMPING AND REPLACEMENT

BACKGROUND

Voice over packet (VOP) technology may be directed to communicating voice information over a packet network. In addition to voice information, VOP networks may also carry tone information that may be interleaved with the voice information. Tone information may be used to communicate commands or control information, such as using Dual Tone Multi-Frequency (DTMF) tones to call a telephone number. A VOP network may need to detect, remove and replace tone information from a voice channel for some applications. This process may be referred to as "tone clamping." Conventional tone clamping technologies, however, may degrade the quality of a voice conversation. Consequently, there may be a need for improved tone clamping techniques to reduce such degradation and other potential problems.

BRIEF DESCRIPTION OF THE DRAWINGS

The subject matter regarded as embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

DETAILED DESCRIPTION

Embodiments of the invention may comprise a method and apparatus to manage tone clamping in a network, such as a VOP network. For example, one embodiment may manage tone clamping for any network node, such as a media gateway. The tone clamping may be performed using background noise. The use of background noise may facilitate the removal of tones from an audio stream while reducing the introduction of extraneous noise or other distractions into the audio stream. The result may be a higher Quality of Service (QoS) for telephone calls completed over a VOP network.

More particularly, one embodiment may perform tone clamping for tone information embedded within a stream of audio information ("audio stream"). The term "audio information" as used herein may refer to any information communicated during a telephone call, such as voice, speech, speech fragments, tone information, silent periods, comfort noise, background noise, music, and so forth. In one embodiment, the audio stream may be received. The received audio stream may be monitored for the presence of tone information. The term "tone information" as used herein may refer to any information used to represent tone signals, including names, tags, frequency components, time information, and so forth. If tone information is detected, the tone information may be removed from the audio stream, and replaced with background noise. The level and spectrum of the background noise may correspond to the background noise measured for the audio stream.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

It is also worthy to note that any reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
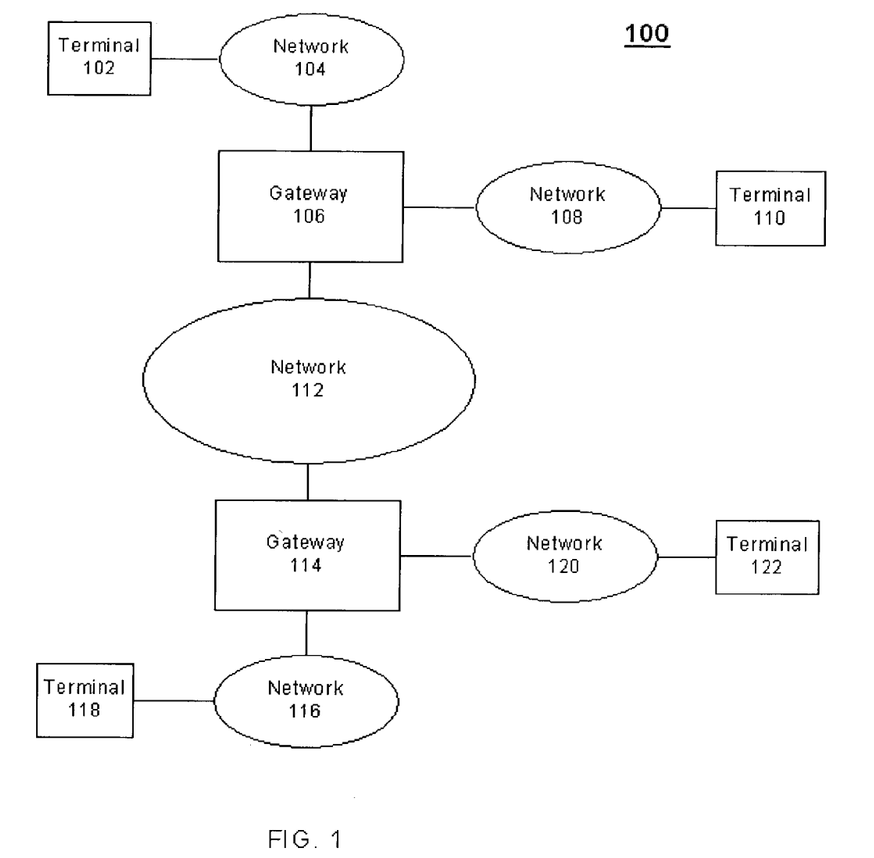
FIG. 1 is a system in accordance with one embodiment.

Referring now in detail to the drawings wherein like parts are designated by like reference numerals throughout, there is illustrated in FIG. 1 a system suitable for practicing one embodiment. FIG. 1 is a block diagram of a system 100 comprising a number of network nodes connected by various communications mediums. A network node in this context may include any device capable of communicating information, such as a call terminal, computer, server, switch, router, bridge, gateway, personal digital assistant (PDA), mobile device, and so forth. Examples of a communications medium may include any medium capable of carrying information signals, such as twisted-pair wire, co-axial cable, fiber optics, radio frequencies, liquids and so forth. It may be further appreciated that the terms "connection" and "interconnection," and variations thereof, in this context may refer to physical connections and/or logical connections. Although FIG. 1 shows a limited number of network nodes for clarity, it can be appreciated that any number of network nodes may be used in system 100 and still fall within the scope of the invention.

More particularly, system 100 may include network nodes 102, 110, 118 and 122. In one embodiment, network nodes 102, 110, 118 and 122 may be call terminals. A call terminal may comprise any device capable of communicating audio information, such as a telephone, a packet telephone, a mobile or cellular telephone, a processing system equipped with a modem or Network Interface Card (NIC), and so forth. In one embodiment, the call terminals may have a microphone to receive analog voice signals from a user, and a speaker to reproduce analog voice signals received from another call terminal.

System 100 may also include various types of networks, such as networks 104, 108, 112, 116 and 120. In one embodiment, networks 104 and 116 may be voice networks. The term "voice network" may refer to a circuit-switched network, such as the Public Switched Telephone Network (PSTN). A circuit-switched network typically establishes a dedicated communications channel or circuit between call terminals. In one embodiment, networks 108, 112 and 120 may be data networks. The term "data network" may refer to a packet network, such as the Internet. Packet networks may be described in more detail below.

In one embodiment, networks 108, 112 and 120 may comprise packet networks. A packet network may comprise one or more network nodes that communicate information as a stream of relatively short packets. A packet in this context may refer to a set of information of a limited length, with the length typically represented in terms of bits or bytes. In general operation, a network node may receive the audio information, and break it up into a series of audio packets. Each packet may comprise a portion of the audio information and control information. The network node may then send the audio packets in sequence to another network node. This process may be repeated until the entire series of packets exit the network or reaches their intended destination.

Each network in system 100 may communicate audio packets in accordance with one or more communications protocols. A protocol may comprise a set of instructions, rules or specifications by which the information signals are communicated over the communications medium. In one embodiment of the invention, for example, networks 108, 112 and 120 may operate in accordance with one or more Internet protocols such as the Internet Engineering Task Force (IETF) document titled "Transmission Control Protocol," Standard 7, Request For Comment (RFC) 793, September, 1981 ("TCP Specification"); and the IETF document titled "Internet Protocol," Standard 5, RFC 791, September, 1981 ("IP Specification").

Networks 108, 112 and 120 may also operate in accordance with one or more VOP protocols, such as the International Telecommunications Union (ITU) document titled "Packet-based Multimedia Communication Systems," Recommendation H.323, November 2000 and available from "www.itu.int" ("H.323 Specification"); the IETF document titled "SIP: Session Initiation Protocol," Proposed Standard, RFC 2543, March 1999 ("SIP Specification); the ITU document titled "Gateway Control Protocol, Version 2," Recommendation H.248.1, May 2002 ("Megaco Specification"); the IETF document titled "RTP Payload for DTMF Digits, Telephony Tones and Telephony Signals,"Proposed Standard, RFC 2833, May 2000 ("RFC 2833 Specification"); and the IETF document titled "RTP: A Transport Protocol For Real Time Applications," Proposed Standard, RFC 1889, January 1996 ("RTP Specification").

Although a few example protocols are discussed herein, it may be appreciated that the embodiments of the invention are not limited in this context. Further, packet networks 108, 112, and 120 may also include the appropriate interfaces to circuit-switched networks such as networks 104 and 116, and vice-versa.

In one embodiment, system 100 may further comprise network nodes 106 and 114. In one embodiment, networks node 106 and 114 may comprise gateways or media gateways. Media gateways 106 and 114 may operate to convert a conventional telephony call to a packet telephony call or VOP call. For example, media gateways 106 and 114 may receive signals from a circuit-switched network, such as networks 104 and 116, and convert the circuit-switched signals into packets. The conversion to packets may be made in accordance with, for example, the TCP/IP Specification, SIP Specification, H.323 Specification, Megaco Specification or other packet protocol. Media gateways 106 and 114 may also receive signals from a packet network, such as networks 108, 112 and 120, and convert the packets into circuit-switched signals or pass them to another packet network.

System 100 may complete a telephone call between call terminals, such as call terminals 102, 110, 118 and 122. The communication path between certain call terminals may comprise both circuit-switched networks and packet networks, as demonstrated by a telephone call between call terminals 102 and 118, for example. The communication path between certain call terminals may comprise only packet networks, as demonstrated by a telephone call between call terminals 110 and 122, for example. In both cases, a portion of the communication path traverses a packet network. Completing a telephone call over a packet network may introduce the need for tone clamping as discussed previously.

In general operation, assume call terminal 102 dials the telephone number for call terminal 118. Network 104 receives the telephone number and initiates a call connection. After a call connection is set-up, call terminal 102 may begin communicating audio information over network 104 to gateway 106. Gateway 106 may convert the audio information represented as circuit-switched signals into packets for transport over network 112. Gateway may convert the audio information into packets and send them to gateway 114. Gateway 114 may receive the packets, often out of order due to the varying network delays experienced by the different packets, and reassembles them as they are received. The packets are then converted back to audio information represented as PCM signals, and the circuit-switched signals are conveyed through network 116 to call terminal 118.

In one embodiment, a telephone call similar to above may be completed without any portion of the audio information traveling over a circuit-switched network such as networks 104 and 116. For example, call terminal 110 may communicate audio information over a call connection with call terminal 122. Call terminal 110 may convert the analog audio signals into digital audio information, and place the audio information into packets. The packets may pass through networks 108, 112 and 120, until they reach call terminal 122. Call terminal 122 may reconstruct the audio information in the form of analog audio signals for conveyance to the listening party. In this case, the embodiments may be implemented in call terminals 110 and 122, for example.

Completing a telephone call over a packet network may introduce the need for tone clamping. Tone clamping may perform the operations of detecting, eliminating and replacing tone information embedded in a stream of audio information. Tone clamping may be discussed in more detail with reference to FIGS. 2-5 and accompanying examples.

Figure 2:
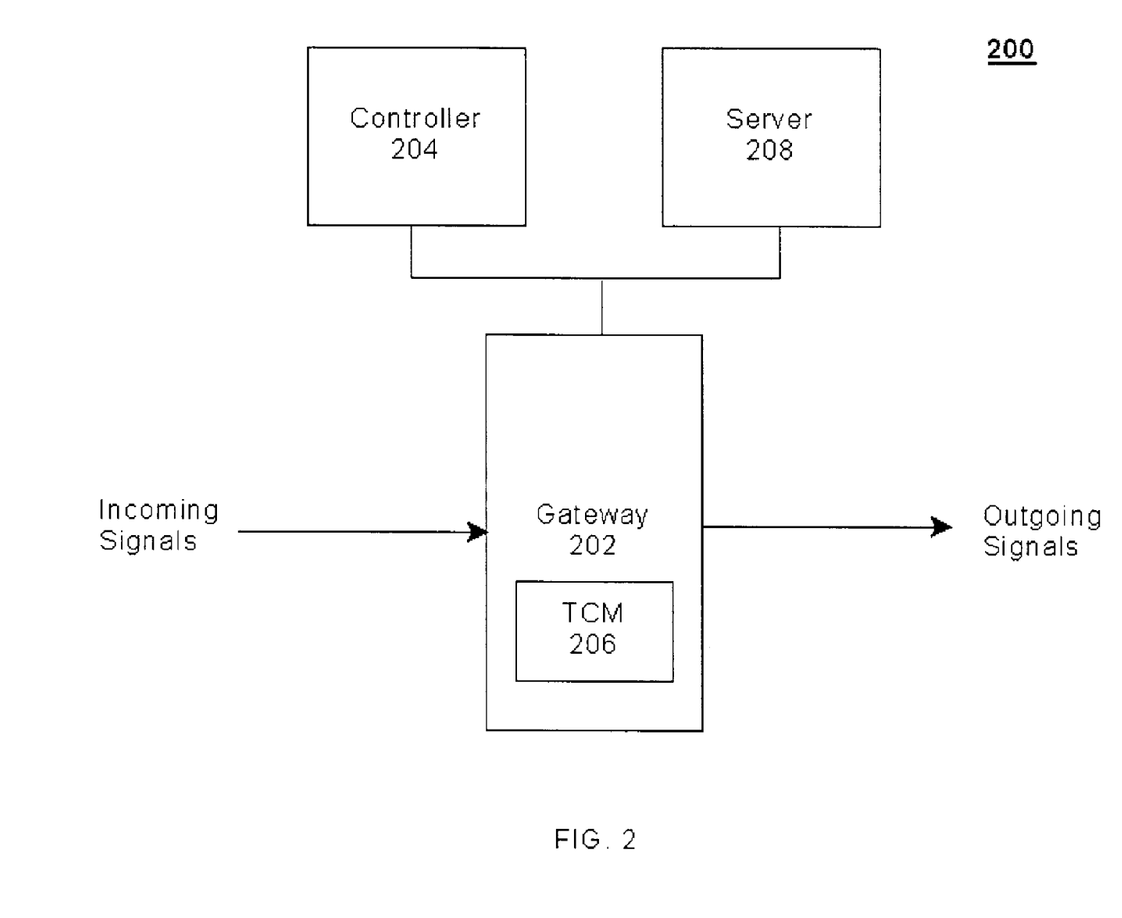
FIG. 2 illustrates a block diagram of a VOP system suitable for use with one embodiment.

FIG. 2 is a block diagram of a processing system in accordance with one embodiment. FIG. 2 may illustrate a processing system 200. Processing system 200 may implement functionality for the various embodiments as software executed by a processor, hardware circuits or structures, or a combination of both. The processor may be a general-purpose or dedicated processor, such as a processor made by Intel Corporation, Motorola Incorporated, Sun Microsystems Incorporated, Compaq Computer Corporation and others. The processor may also be a specialized processor, such as a digital signal processor (DSP) with accompanying architecture, a network processor, embedded processor, micro-controller, controller and so forth. The software may comprise programming logic, instructions or data to implement certain functionality for an embodiment. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment, the media may store programming instructions in a compressed and/or encrypted format, as well as instructions that may have to be compiled or installed by an installer before being executed by the processor. Alternatively, an embodiment may be implemented as specific hardware components that contain hard-wired logic for performing the recited functionality, or by any combination of programmed general-purpose computer components and custom hardware components.

In one embodiment, processing system 200 may implement some functionality for a gateway. System 200 may implement functionality for a gateway, such as gateways 106 and 114, for example. Although this functionality is shown as part of gateways 106 and 114, it can be appreciated that this functionality can be implemented in any device connected to systems 100 or 200, and still fall within the scope of the embodiments. For example, in the case of completing a telephone call between call terminals 110 and 122, processing system 200 may be implemented in call terminals 110 and 122 instead of gateways 106 and 114, respectively, as desired for a particular implementation. In another example, system 200 may be implemented as part of an application server for a gateway, such as server 208. This may be desirable to eliminate tones from a conference call, as discussed in more detail below.

In one embodiment, gateway 200 may comprise an element 202. Element 202 of system 200 may comprise, for example, a media gateway 200 that may operate to convert a conventional telephony call to a packet telephony call or VOP call. In one embodiment, gateway 202 may receive signals from a circuit-switched network and convert them to packet voice signals. An example of a circuit-switched network may be the PSTN. An example of signals communicated via a circuit-switched network may comprise Pulse Code Modulated (PCM) signals. The conversion to packets may be made in accordance with, for example, any number of protocols, such as the RTP Specification and others. Gateway 202 may communicate both call control packets and packet voice signals through other components of system 200 until the packets reach their intended destination, e.g., a call terminal connected to system 200.

In one embodiment, gateway 200 may also comprise an element 204. Element 204 of system 200 may comprise, for example, a media gateway controller or gatekeeper to perform conventional call processing functions, such as address translation, admission control, call control signaling, call authorization, call management and so forth in accordance with any appropriate call processing protocol, such as the Megaco Specification, for example. Controller 204 may communicate with gateway 202 via call control packets to perform such call processing functions. In one embodiment, controller 204 may provide address and routing information to communicate packets through system 200 to the destination call terminal, such as call terminal 106.

In one embodiment, gateway 200 may also comprise an element 208. Element 208 of gateway 200 may be, for example, an application server. An example of an application server may be a conferencing server or a Multipoint Control Unit (MCU) for a VOP system. Server 208 may implement conventional MCU, multipoint controller (MC) and multipoint processor (MP) functions in accordance with the H.323 Specification, and may also implement general conference control (GCC) and multipoint communication service (MCS) functions. Server 208 may process a multipoint conference call, and may depacketize encapsulated packets of multiple streams of multimedia information to form a multimedia conferencing session. For example, server 208 may receive various streams of audio information and multiplex/demultiplex the streams together to enable various call terminals to communicate audio information between each other for a conference call session.

In one embodiment, gateway 202 may also include a Tone Clamping Module (TCM) 206. TCM 206 may perform tone clamping for system 200. Tone clamping may perform the operations of detecting, eliminating and replacing tone information embedded in a stream of audio information. This may be desirable for a number of reasons.

One system that may need tone clamping may be a VOP network that communicates tone information using a control channel separate from the audio channel. This may be desired for a system using a low bit-rate voice coder/decoder ("codec"), for example. A low bit-rate voice codec may compress the tone information to a point that it becomes undetectable. The control channel may be used to bypass the voice codec for certain types of information, such as tone information. The use of a control channel to communicate tone information may sometimes be referred to as "Out Of Band" signaling. Meanwhile, that same tone information may still be communicated in the audio channel. When tone information is communicated using Out Of Band signaling, there may be need to remove the tone information from the audio channel to reduce ambiguity at the receiver.

Another system that may need tone clamping may be a voice conferencing system. In conferencing applications, DTMF tones may be used to provide commands to a conferencing server to implement functions on behalf of a conference participant. For example, a conference participant may press the DTMF digit "1" to increase the volume. The dialed digit, however, may be heard by the other conference participants. Tone clamping may be implemented so that the other conference participants will not hear the command-oriented DTMF digits.

For some applications, it may be desirable to replace the eliminated tone information with other information. For example, the tone information may be replaced with silence information. Silence information is typically information with zero or very low energy levels. Some analog phones and other Customer Premise Equipment (CPE), however, may send out background noise instead of complete silence. Using pure silence replacement for tones in these situations may create discontinuities such as a hissing sound. The resulting audio stream may have a sequence of background noise and silent periods, which may sound unnatural to a human listener.

To reduce this problem, one embodiment utilizes background information to replace tone information. The background information inserted into the audio stream may reduce the audio discontinuities, and provide a more natural sound to a human listener. The result may be improved quality of a telephone call over a VOP system.

Figure 3:
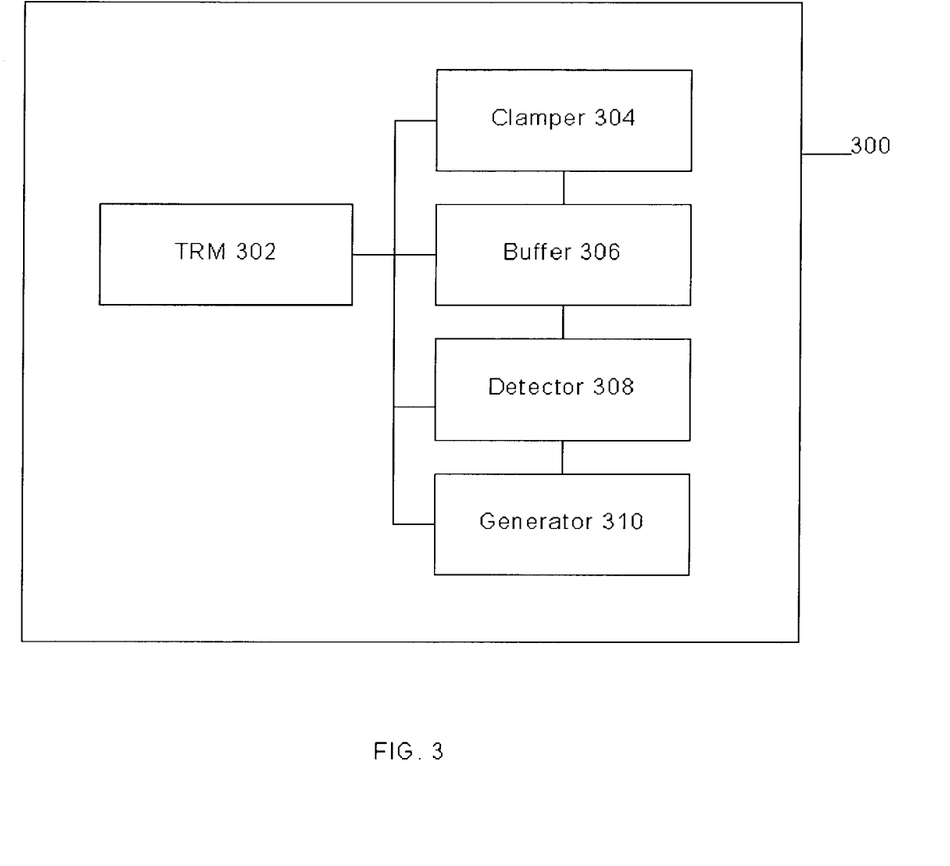
FIG. 3 illustrates a block diagram of a Tone Clamping Module (TCM) in accordance with one embodiment.

FIG. 3 illustrates a block diagram of a Tone Clamping Module (TCM) in accordance with one embodiment. FIG. 3 illustrates a TCM 300 that may be representative of TCM 206. TCM 300 may perform tone clamping for system 200. TCM 300 may comprise, for example, a Tone Replacement Manager (TRM) module 302, a tone damper 304, a circular buffer 306, a tone detector 308, and a background noise generator 310.

In one embodiment, TCM 300 may receive a stream of audio information. Tone detector 308 may be configured to analyze the incoming stream of audio information to detect the existence of any tone information. The tone information may comprise, for example, a DTMF tone. Tone detector 308 may make a tone activity decision on a periodic basis. The period may vary based on any number of criteria, such as the voice codec frame size used by the system. A set of parameters may be extracted from the audio stream and used for an initial decision. The parameters may be any tone parameters, such as the full band energy, the low band energy, the zero-crossing rate, a spectral measure and so forth. The parameters may be compared to a profile of parameters for one or more tones. If there is a match, tone detector 308 may return a decision that tone information has been detected.

In one embodiment, the audio information may be stored in circular buffer 306. Circular buffer 306 may be configured to store the incoming stream of audio information long enough for tone detector 308 to determine whether a tone has been detected. The amount of audio information stored in circular buffer 306 may depend upon the length of time it takes tone detector 308 to detect any tone information in the stream of audio information. The longer the detection time the more buffer must be used to store the incoming stream, and vice-versa. The presence of circular buffer 306 helps reduce the possibility that a receiver may process some tone information before the tone information is properly detected and clamped. Otherwise, a user of the receiver may experience severe quality problems, such as hearing a "clicking" sound every time a tone event occurs.

In one embodiment, the circular buffer size may be modified in accordance with performance characteristics of the tone clamping operation to improve detection accuracy. For example, in one case the circular buffer size may be too large based on the performance evaluation of the tone clamping process, and therefore the circular buffer size may be decreased without affecting detection accuracy or Quality of Service (QoS). The unallocated memory may then be used for other operations in system 200. In another case, the circular buffer size may be too small thereby preventing tone replacement. The circular buffer size may be increased to compensate for this condition.

In one embodiment, the analysis may be performed by first defining at least one parameter associated with the buffer. The at least one parameter may be measured. The measured value may be compared with a predetermined value, such as a previous measurement or some threshold parameter. For example, the parameter may be defined as a value representing the amount of buffer used to store audio information prior to tone detection. Buffer usage may be measured during the tone detection process, and compared to a predetermined value. The predetermined value may be, for example, a previous value for buffer usage, an average buffer usage value over some number of tone clamping operations, a theoretical buffer usage value optimized for a given tone detector, and so forth.

Once tone detector 308 detects tone information from the audio information stored in circular buffer 306, tone damper 304 may erase the tone information from the stream of audio information. As a result, the audio stream will have a gap where the tone information was originally inserted into the audio stream. This gap may be filled using background noise generator 310.

In on embodiment, background noise generator 310 may analyze and synthesis background noise for a given audio stream. The synthesized background noise may then be inserted into the audio stream. Background noise generator 310 may analyze the incoming audio stream to determine one or more parameters representing the background noise for a sample section of the audio stream. The background noise parameters may be, for example, the full band energy, the low band energy, the zero-crossing rate, a spectral measure and so forth. The sample section of the audio stream may comprise, for example, a preceding frame, a subsequent frame, or an average of a plurality of frames over varying time periods. Once the appropriate background noise parameters are determined for the audio stream, the background noise parameters may be used to synthesize background noise similar to the sample section. The synthesized background noise may be inserted into the audio stream in the gaps created by removing the tone information.

In one embodiment, TRM 302 may coordinate the tone replacement process. For example, TRM 302 may monitor tone damper 304, circular buffer 306, tone detector 308, and background noise generator 310, and send control signals to each element to perform management and timing functions. For example, TRM 302 may monitor circular buffer 306 to determine when audio information associated with a particular stream of information is beginning to be stored, e.g., the beginning of the buffer. TRM 302 may monitor tone detector 308 for a signal indicating that tone information has been detected. Once TRM 302 receives the tone detection signal, TRM 302 may examine circular buffer 306 to determine how much of it has been used prior to tone detection. Assume that the measured value is 80% of the total buffer size, with the 80% representing that 80% of circular buffer 306 was used prior to tone detection. The measured value of 80% may be compared to a predetermined value. Assume that the predetermined value was 100%, and TRM 302 has been configured to reduce buffer size if the measured value is less than the predetermined value. In this case, TRM 302 may send a signal to circular buffer 306 to reduce its buffer size by 20%. TRM 302 may also be used to store, update and manage profiles for tone parameters used by tone detector 308. Further, TRM 302 may be used to store, update and manage background noise parameters for background noise generator 310, as well as modify sample size to improve integration of the synthesized background noise with the background noise of the audio stream.

The operations of systems 100, 200 and 300 may be further described with reference to FIGS. 4-5 and accompanying examples. Although FIGS. 4-5 as presented herein may include a particular processing logic, it can be appreciated that the processing logic merely provides an example of how the general functionality described herein can be implemented. Further, each operation within a given processing logic does not necessarily have to be executed in the order presented unless otherwise indicated.

Figure 4:
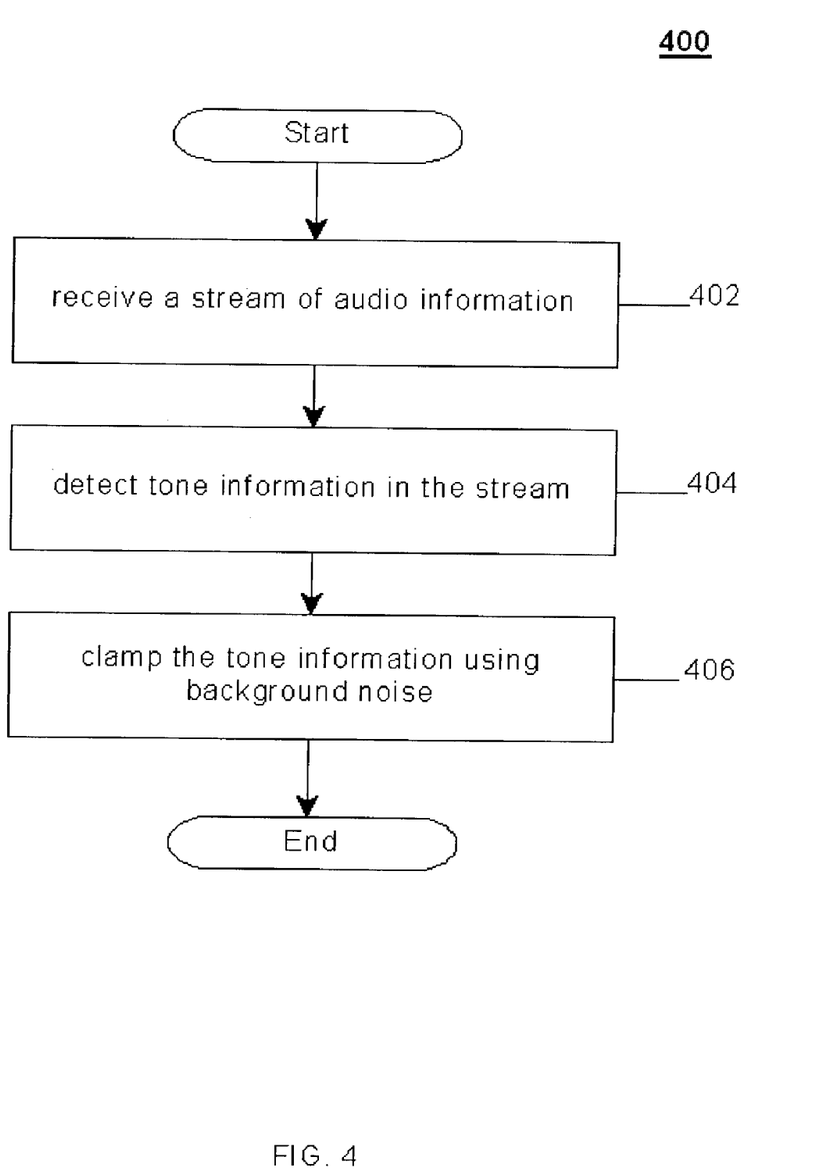
FIG. 4 is a first block flow diagram of the programming logic for a TCM in accordance with one embodiment.

FIG. 4 is a first block flow diagram of the programming logic performed by a TCM in accordance with one embodiment. In one embodiment, this or other modules may refer to the software and/or hardware used to implement the functionality for one or more embodiments as described herein. In this embodiment, this or other modules may be implemented as part of a system, such as TCM 206 of gateway 202. It can be appreciated that this functionality, however, may be implemented by any device, or combination of devices, located anywhere in a communication network and still fall within the scope of the invention.

FIG. 4 illustrates a programming logic 400 to manage tone clamping for a network node. As shown in programming logic 400, a stream of audio information may be received at block 402. Tone information may be detected in the stream at block 404. An example of tone information may be a DTMF tone. The tone information may be clamped using background noise at block 406.

In one embodiment, the tone information may be detected by extracting one or more tone parameters from the stream. The extracted tone parameters may be compared to a set of reference tone parameters. An output signal may be created indicating the presence of the tone information in accordance with the comparison. For example, the output signal may be a 0 to indicate no tone information, and a 1 to indicate the presence of tone information. The embodiments are not limited in this context.

Figure 5:
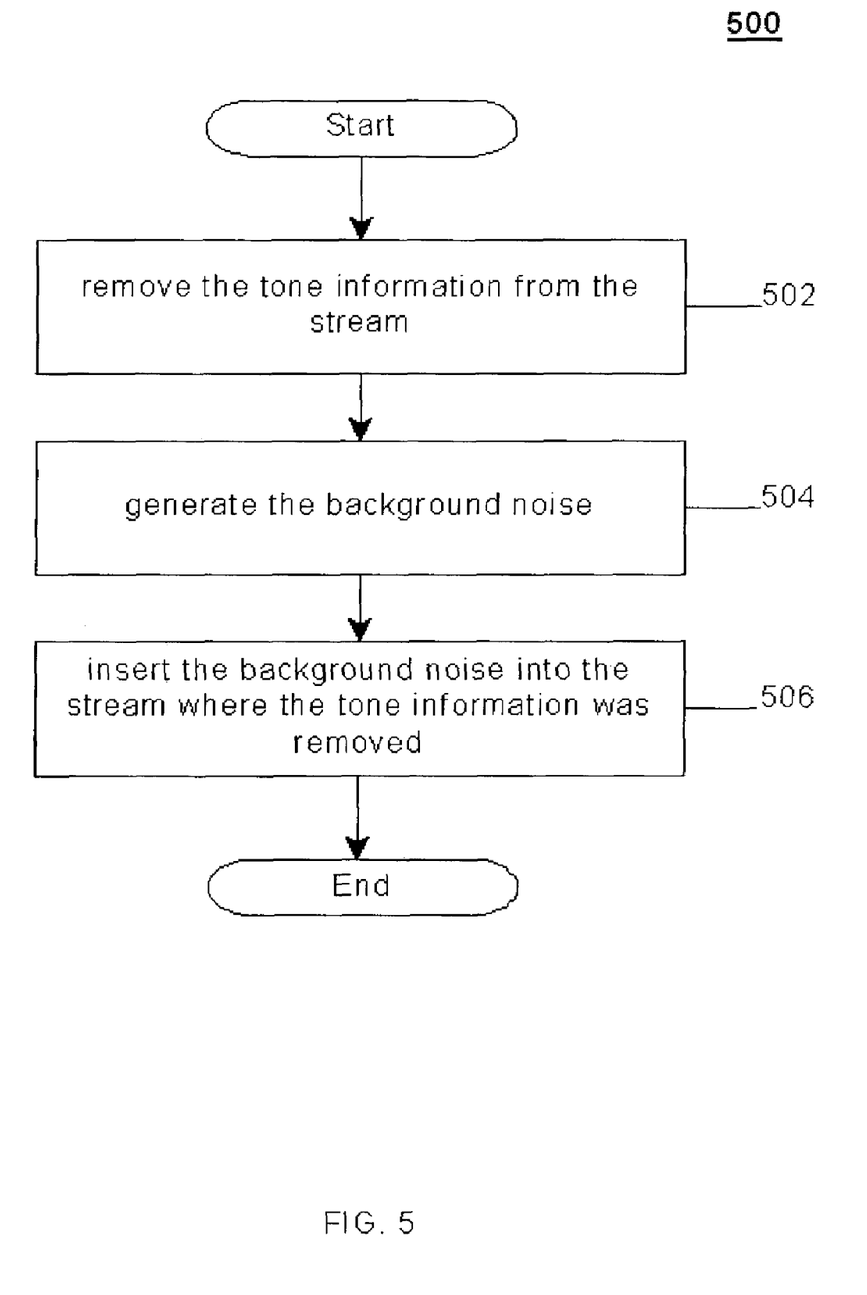
FIG. 5 is a second block flow diagram of the programming logic for a TCM in accordance with one embodiment.

FIG. 5 is a second block flow diagram of the programming logic performed by a TCM in accordance with one embodiment. FIG. 5 illustrates a programming logic 500. Programming logic 500 may illustrate an example of the operations for block 406 described with reference to FIG. 4. As shown in programming logic 500, the tone information may be clamped by removing the tone information from the stream at block 502. Background noise may be generated at block 504. The background noise may be inserted into the stream where the tone information was removed at block 506.

In one embodiment, the background noise may be generated by extracting one or more background noise parameters from the stream. The background noise parameters may be extracted on a periodic basis to ensure that the background noise appropriately matches the background noise for the frames preceding and succeeding the gap created by the removed tone information. The period may vary, and an example may be a time period corresponding to a voice coded frame. The background noise to be inserted into the stream may then be synthesized using the background noise parameter(s). The background noise parameters may be any parameters for an audio signal, such as the full band energy, low band energy, zero-crossing rate, and a spectral measure, for example.

The operation of systems 100, 200 and 300, and the processing logic shown in FIGS. 4-5, may be better understood by way of example. Assume a caller uses call terminal 102 to initiate a telephone call session to call terminal 118. The caller dials the 10 digit telephone number, and the call is completed through networks 104, 112 and 116, as well as gateways 106 and 116. Call terminal 102 sends circuit-switched signals over network 104, which are received by gateway 106. Gateway 106 includes PSTN interface cards and technology to convert the circuit-switched signals to packet-switched signals. Gateway 106 detects the DTMF signals and begins creating RTP tone packets. The RTP tone packets are routed using a separate control channel to gateway 114. Meanwhile, packets carrying audio information are also generated by gateway 106. The audio information may be communicated using an audio channel to gateway 114. The audio information, however, may also include the tone information sent via the RTP tone packets. In this case, the audio information may be sent to TCM 300 to remove any tone information.

TCM 300 may receive a stream of packets carrying the audio information, and begin buffering the packets in circular buffer 306. Tone detector 308 begins the tone detection process. Once tone detector 308 determines that a tone is present in the audio information, tone damper 304 may drop all the packets in circular buffer 306 and begin removing the tone information detected by tone detector 308 from the audio stream.

During this process, background noise generator 310 may be extracting one or more background noise parameters from one or more frames of audio information carried by the audio stream. Background noise generator 310 may use the background noise parameters to synthesize background noise. The background noise parameters may be updated on a periodic basis as determined for a particular implementation. Background noise generator 310 may then insert the synthesized background noise into the gaps in the frames which held the removed tone information. The result will be reduced hissing or clicking sounds carried by the audio stream, which may in turn result in a better listening experience once the audio stream is converted into analog voice signals and played out to the listener.

To manage the tone replacement process, TRM 302 may be monitoring tone clamper 304, circular buffer 306, tone detector 308, and background noise generator 310. TRM 302 may modify parameters for each element as needed, either during call setup or during the call session in accordance with a particular implementation.

In another example, the embodiments may be implemented for a voice conferencing system. In conferencing applications, DTMF tones may be used to provide commands to a conferencing server to implement functions on behalf of a conference participant. For example, a conference participant may press the DTMF digit "1" to increase the volume. The dialed digit, however, may be heard by the other conference participants. Tone clamping may be implemented so that the other conference participants will not hear the command-oriented DTMF digits.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to manage tone clamping, comprising:
receiving a stream of audio information;
detecting tone information in said stream;
replacing said tone information with background noise in response to detecting a tone in said tone information, wherein said background noise corresponds to background noise measured for said stream of audio; and
wherein said replacing comprises:
removing said tone information from said stream;
generating said background noise; and
inserting said background noise into said stream where said tone information was removed;
wherein said generating said background noise comprises extracting at least one background noise parameter from said stream and synthesizing said background noise using said extracted background noise parameter.

2. The method of claim 1, wherein said tone information represents a Dual Tone Multi-Frequency (DTMF) tone.

3. The method of claim 1, wherein said detecting comprises:
extracting at least one tone parameter from said stream;
comparing said extracted tone parameter with a reference tone parameter; and
creating an output signal indicating whether said tone information is present in said stream in accordance with said comparison.

4. The method of claim 1, wherein said extracting comprises:
selecting a time period for said stream; and
extracting said background noise parameter using said time period.

5. The method of claim 4, wherein said background noise parameter is at least one of a parameter representing full band energy, low band energy, zero-crossing rate, and a spectral measure.

6. A system, comprising:
a first call terminal to originate audio information;
a gateway connected to said first call terminal to receive said audio information;
a tone clamping module connected to said gateway, said tone clamping module clamping tone information in said audio information by replacing said tone information with background noise in response to detecting a tone in said tone information, wherein said background noise corresponds to background noise measured for said stream of audio;
a second call terminal to receive said tone clamped audio information; and
wherein said tone clamping module further comprises a background noise generator to synthesize and insert background noise into said audio information to replace said tone information;
wherein said background noise generator extracts at least one background noise parameter from said audio information, and uses said background noise parameter to synthesize said background noise.

7. The system of claim 6, wherein said tone clamping module further comprises:
a buffer to store said audio information;
a tone detector to detect tone information in said audio information; and
a tone damper to remove tone information from said audio information.

8. The system of claim 7, further comprising a tone replacement manager to send control information to said buffer, tone detector, tone damper and background noise generator.

9. An apparatus, comprising:
a buffer to store audio information;
a tone detector to detect tone information in said audio information;
a tone damper to remove tone information from said audio information; and
a background noise generator to synthesize and insert background noise into said audio information to replace said tone information in response to detecting a tone in said tone information, wherein said background noise corresponds to background noise measured for said stream of audio; and
wherein said background noise generator extracts at least one background noise parameter from said audio information, and uses said background noise parameter to synthesize said background noise.

10. The apparatus of claim 9, further comprising a tone replacement manager to send control information to said buffer, tone detector, tone damper and background noise generator.

11. The apparatus of claim 9, wherein said tone detector may detect said tone information using at least one tone parameter, and send an output signal indicating if said tone information is detected.

12. The method of claim 9, wherein said background noise parameter is at least one of a parameter representing full band energy, low band energy, zero-crossing rate, and a spectral measure.

13. An article comprising:
a storage medium;
said storage medium including stored instructions that, when executed by a processor, result in managing by receiving a stream of audio information, detecting tone information in said stream, and replacing said tone information with background noise in response to detecting a tone in said tone information, wherein said background noise corresponds to background noise measured for said stream of audio; and
wherein said replacing comprises removing said tone information from said stream, generating said background noise, and inserting said background noise into said stream where said tone information was removed;
wherein said generating said background noise comprises extracting at least one background noise parameter from said stream, and synthesizing said background noise using said extracted background noise parameter.

14. The article of claim 13, wherein the stored instructions, when executed by a processor, further result in said detecting by extracting at least one tone parameters from said stream, comparing said extracted tone parameter with a reference tone parameter; and creating an output signal indicating whether said tone information is present in said stream in accordance with said comparison.

15. The article of claim 13, wherein the stored instructions, when executed by a processor, further result in said extracting comprises selecting a time period for said stream, and extracting said background noise parameter using said time period.

* * * * *

UNITED STATES PATENT AND TRADEMARK OFFICE
CERTIFICATE OF CORRECTION

PATENT NO.       : 7,313,233 B2                                         Page 1 of 1
APPLICATION NO.  : 10/459309
DATED            : December 25, 2007
INVENTOR(S)      : Rhemtulla et al.

It is certified that error appears in the above-identified patent and that said Letters Patent is hereby corrected as shown below:

In column 11, line 19, in Claim 7, delete "damper" and insert -- clamper --, therefor.

In column 11, line 23, in Claim 8, delete "damper" and insert -- clamper --, therefor.

In column 11, line 29, in Claim 9, delete "damper" and insert -- clamper --, therefor.

In column 11, line 43, in Claim 10, delete "damper" and insert -- clamper --, therefor.

Signed and Sealed this

First Day of July, 2008

JON W. DUDAS
*Director of the United States Patent and Trademark Office*